Dec. 28, 1937.   C. SCHLEIFER   2,103,436
WHARVE FOR SPINDLES FOR SPINNING, TWISTING, WINDING, AND SIMILAR MACHINES
Filed June 23, 1936
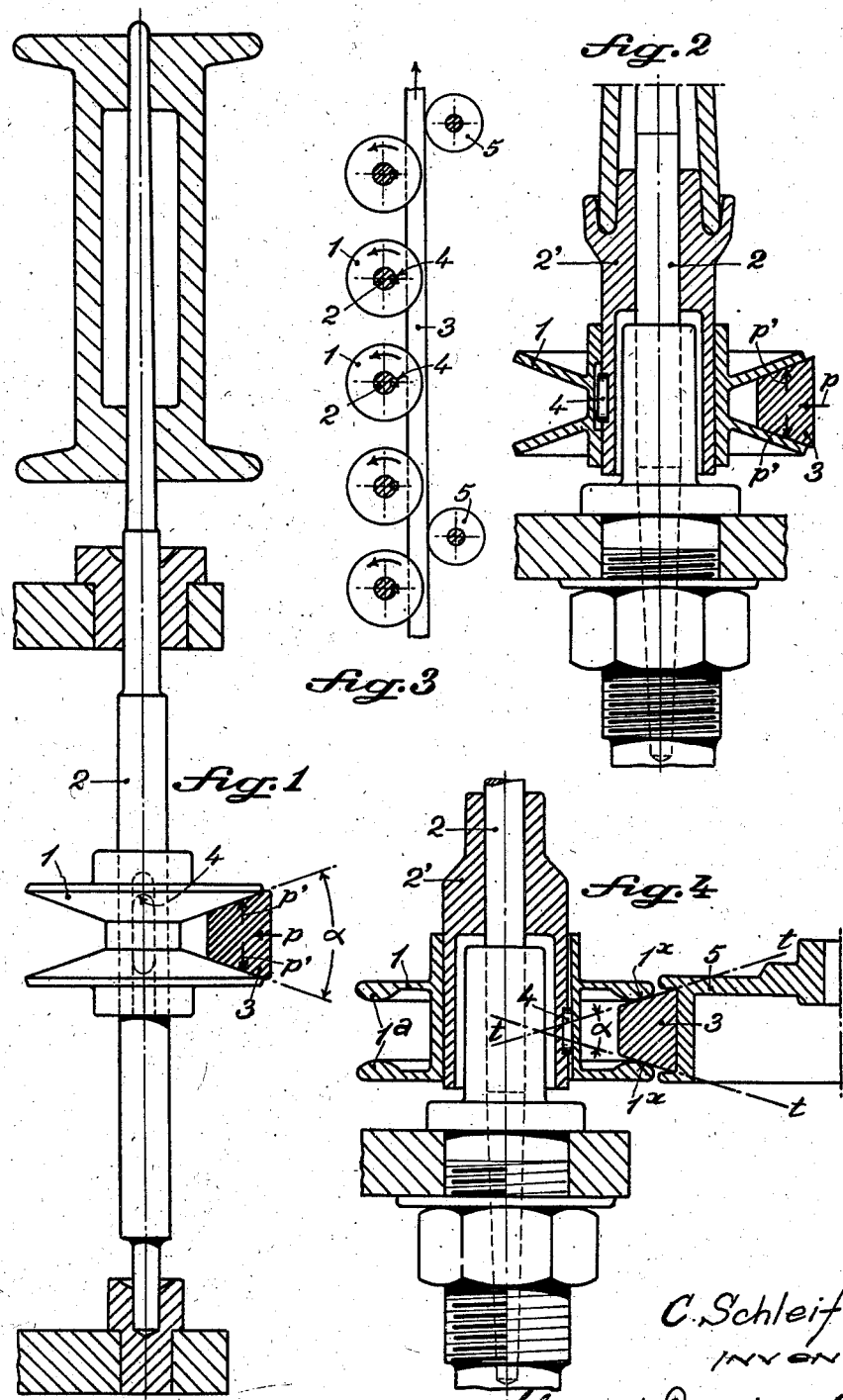

Patented Dec. 28, 1937

2,103,436

UNITED STATES PATENT OFFICE 2,103,436

WHARVE FOR SPINDLES FOR SPINNING, TWISTING, WINDING, AND SIMILAR MACHINES

Carlo Schleifer, Novara, Italy

Application June 23, 1936, Serial No. 86,835
In Italy July 4, 1935

4 Claims. (Cl. 118—47)

The object of the present invention is a wharve for spindles for spinning, twisting, winding or other machines intended to be driven by means of a continuous flexible member in tangential engagement with the wharves of a plurality of spindles. The features of the said wharve consist essentially in its form and mounting on the spindle.

The new wharve is shown, by way of example only, in Figures 1 and 2 of the attached drawing as applied to two known types of spindles, while Figure 3 shows in plan the drive of a plurality of spindles; Figure 4 shows a modification of the wharve.

The wharve according to the present invention and to the form of construction in Figures 1 and 2 is constituted by a pulley 1 having a triangular groove of acute angle $\alpha$ and which in the example of Figure 1 is mounted directly on the spindle 2, while in the case of Figure 2 it is mounted on the bush 2' integral with the said spindle 2. This mounting is arranged in such a way that the wharve is integral with the spindle in the direction of rotation in order to transmit to the spindle the movement imparted to the wharve by the continuous driving member or belt 3 in tangential engagement with the groove of the said wharve. If it were possible to arrange all the wharves 1 of an assembly of several spindles 2 to be driven (see Figure 3) exactly at the same height and consequently in alignment with the belt 3, these wharves could be secured to remain on the spindle. But since this condition is difficult to fulfill in practice it is preferable when these wharves become free to displace themselves upwards, i. e. in an axial direction. For this purpose the wharve 1 is set on the spindle 2 or the bush 2' by means of a sliding key 4 for example, fixed to one of the parts and with which the other part engages by means of an axial groove with which it is provided. Due to this arrangement the wharves of the different spindles are capable of adjusting their own height and of holding themselves exactly in alignment with the belt 3. In this way any stress induced on the wharves which might put the spindles into vibration is avoided.

As shown in Figure 3 the continuous driving member or belt 3 is held in the desired position of engagement by means of guide rollers 5 arranged for each two spindles or more. By this arrangement the belt 3 is forced between the grooves of different wharves 1 under the action of a radial push $p$ which is supported by the bearings of the spindles and gives rise to axial pushes $p'$ ensuring the desired adherence of the said belt 3 with the flanges of each pulley 1. It is evident that assuming a radial push $p$, the pushes $p'$ are greater in proportion as the acute angle $\alpha$ is smaller. By suitably choosing the value of this angle, even with a very small radial push $p$, very considerable axial pushes $p'$ can be obtained. In order that these conditions shall be fulfilled it is necessary for the belt 3 to bear only on the flanges of the pulley 1 and not to become displaced to the bottom of the groove.

The wharve according to the present invention has the great advantage over the usual wharves for spindles in the form of a cylindrical pulley or even if desired with a triangular groove but with an obtuse angle, in that the desired adherence of the driving belt 3 is assured even under the action of a minimum radial push.

In the example shown in Figures 1 and 2 it is assumed that the member 3 is constituted by a trapezoidal belt but it is evident that a belt with a circular, polygonal or any other section can also be used.

It is to be noted that with the forms of wharve hereinabove described, whatever may be the section of the belt 3, when the latter penetrates more or less into the groove of the pulley, the distance of the shaft of the latter from the zone of contact is changed and consequently the speed of the spindle also changes. Further, the zones of contact between the belt and the flanges of the pulley are relatively great and possess at different points, different peripheral speeds. Consequently at these zones of contact sliding is produced between the pulley and the belt which has a particular linear velocity and this sliding in addition to producing losses by friction prevents a uniform spindle speed from being obtained.

The modification in the form of the pulley shown in Figure 4 overcomes these disadvantages. According to this form each flange of the pulley 1 is provided with a rounded lip 1$^a$ to which the belt 3 guided by the guide rollers 5 is tangential. The contact between the belt and the pulley takes place at two single opposite points 1$^x$ having the same peripheral speed provided that the lines of tangency $t$—$t$ at these points intersecting the axis of the spindle are equally inclined on opposite sides with respect to the said axis. In order that the wharve even in this improved form shall behave virtually as regards its operation, as a pulley with triangular groove having an acute angle, it is necessary that the angle $\alpha$ formed by the said tangents $t$—$t$ should be acute.

On account of the form of the wharve hereinabove described, whatever may be the degree of penetration of the belt 3 in the pulley, these points of contact t$^x$ do not change, whatever may be essection of the belt, trapezoidal, polygonal or circular, provided that the directions of the lines of tangency t—t remain the same. All sliding between the belt and the pulley flanges is thus prevented and a well defined uniform speed is ensured for the spindle 2.

What I claim is:—

1. In a spinning device, parallel spindles, a wharve on each of said spindles, means mounting the wharves on the spindles to move longitudinally thereof but to revolve therewith, and a flexible belt in contact with said wharves and adapted to drive them.

2. The device as claimed in claim 1 in which the flexible belt has a peripheral trapezoidal cross-section, the prolongation of the sides of which meet at an acute angle and the wharve has a corresponding trapezoidal cross-section.

3. The device as claimed in claim 1 in which the wharve comprises two flanges extending outwardly from its hub and a convex protuberance extending from each of the surfaces of said plates facing each other and in which the flexible belt has a trapezoidal cross-section with the short side toward the wharve whereby the wharve and the belt will have substantially line contact only.

4. A wharve comprising a hub, means for mounting said wharve slidably but non-revolvably on a spindle, two plates extending outwardly from said hub and an annular convex protuberance extending from the inner peripheral portion of each of said plates.

CARLO SCHLEIFER.